Nov. 16, 1965    W. E. WOOLLENWEBER, JR    3,218,029
TURBINE HOUSING FOR TURBOCHARGERS
Filed April 20, 1964    2 Sheets-Sheet 2

INVENTOR.
WILLIAM E. WOOLLENWEBER, JR.
BY
*Lockwood, Woodard, Smith & Weikart*
Attorneys United States Patent Office 3,218,029
Patented Nov. 16, 1965

3,218,029
TURBINE HOUSING FOR TURBOCHARGERS
William E. Woollenweber, Jr., Columbus, Ind., assignor to Schwitzer Corporation, Indianapolis, Ind., a corporation of Indiana
Filed Apr. 20, 1964, Ser. No. 361,168
5 Claims. (Cl. 253—55)

This invention relates generally to turbochargers for internal combustion engines and in particular to a turbine housing for the exhaust gas turbine component of an internal combustion engine turbocharger, the housing having the area of entry to the turbine wheel divided both longitudinally and transversely.

A wide variety of turbine designs have been utilized in the past in applying turbochargers to internal combustion engines. In land vehicle applications among others, a persistent problem exists in furnishing enough exhaust gas energy to the turbine under low speed, high torque or load conditions. One solution to the problem has been to use the Buchi type divided exhaust manifold with a divided turbine housing. Such conventional divided turbine housings utilize several volute intake passages each receiving exhaust gases from separate exhaust manifold passages. My copending patent application, Serial No. 314,757, filed October 8, 1963, titled "Divided Turbine Housing for Turbochargers" discloses and claims a multi-inlet turbine of the type referred to which does not require a nozzle ring.

In my copending patent application Serial No. 314,708, filed October 8, 1963, titled "Velocity Energy Turbocharging System" there is disclosed and claimed a system in which each engine exhaust valve communicates by a separate passage to a separate portion of the turbine wheel periphery. Such applications require turbochargers with turbine components whose housings incorporate mutliple intake passages each opening into a separate arc segment of the turbine wheel periphery. Where the velocity energy system referred to above is utilized, these intake passages in the turbine housing must be of uniform cross-sectional area. Where a conventional system is utilized, the intake passages must have a slightly diminishing cross-sectional area over a portion of their length to return the exhaust gases to the proper velocity prior to their entry to the turbine wheel.

It is the primary object of the present invention to provide a turbine housing structure in which the total area of entry for gases to the turbine wheel is divided both longitudinally and transversely so as to provide a maximum of separate exhaust gas passages to the turbine wheel or rotor with each passage extending open to a maximum arcuate portion of the turbine wheel periphery.

This and other objects will become apparent as the description proceeds with reference to the accompanying drawings in which.

Figure 1:
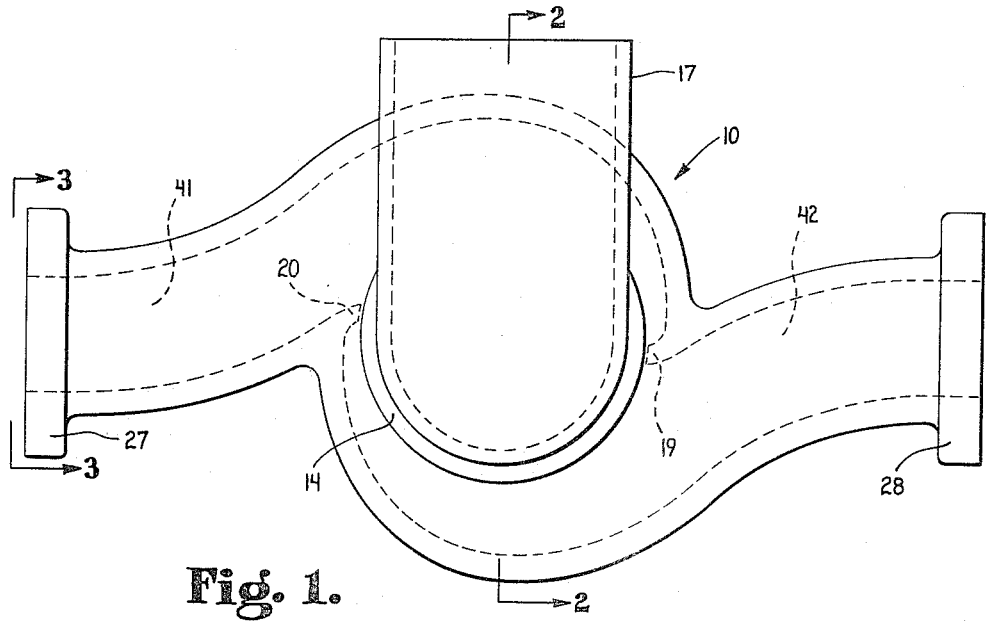
FIG. 1 is a side view of a turbine component of an internal combustion engine turbocharger having four intake apertures and having passages of uniform cross-sectional area joining the intake apertures and the turbine wheel periphery.
Figure 2:
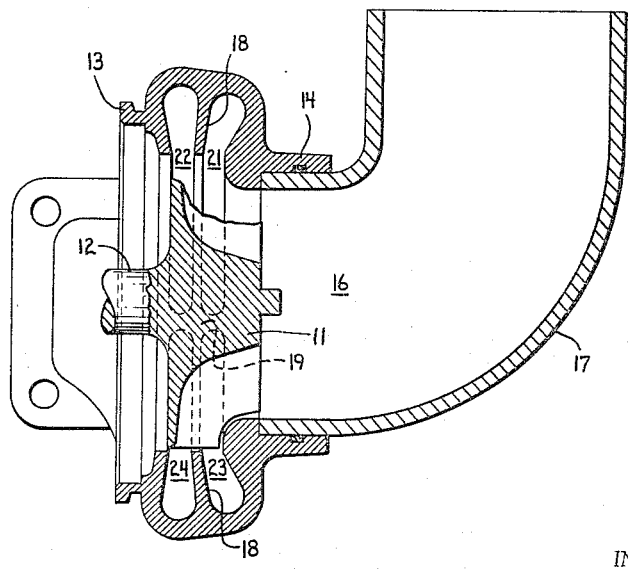
FIG. 2 is a side sectional view taken generally along the line 2—2 of FIG. 1.
Figure 3:
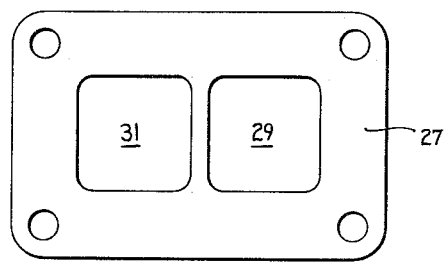
FIG. 3 is a view taken generally along the line 3—3 of FIG. 1.

Referring initially to FIGS. 1, 2 and 3, the turbine housing 10 encloses a conventional bladed turbine wheel 11 (FIG. 2). The turbine wheel is adapted to drive the shaft 12, the shaft also carrying the compressor rotor (not shown). The flanged portion 13 (FIG. 2) of the turbine housing casting is adapted to be sealed by a clamp ring (not shown) to the adjacent intermediate casting of the turbine-compressor combination which makes up the turbocharger. The central portion of the housing is formed to provide an outlet flange 14 which defines the turbine outlet passage 16. The outlet flange may accommodate an outlet fitting 17 which serves, with additional ducting, not shown, to release gases leaving the turbine to atmosphere or to the exhaust stack system of the engine served by the turbocharger.

The housing is formed to provide a central, radially inwardly projecting partition 18 which forms two parallel arcuate cavities encircling the turbine wheel periphery and open thereto as will be apparent in FIG. 2. The cavities are divided transversely by an integral wall indicated at 19 in FIGS. 1 and 2, it being understood that a similar integral wall 20, shown in FIG. 1, divides or breaks the continuity of the cavities in the portion of the housing broken away in FIG. 2. The transverse partitions 19 and 20 thus divide the cavities into four separated volute passages 21, 22, 23 and 24, each opening to the periphery of the turbine wheel.

The turbine housing is further formed to provide inlet flanges 27, and 28 each having two separate turbine intake apertures therein, the intake apertures in the flange 27 being shown at 29 and 31 in FIG. 3. The inlet flanges 27 and 28 may be mounted upon the divided, engine exhaust manifold (of the Buchitype, for example) so that exhaust gases from certain of the engine cylinders may be transmitted to the intake apertures in the flanges 27 and 28.

Immediately downstream of the intake apertures in the flanges 27 and 28, the housing 10 is formed so as to provide side by side passages of uniform cross-sectional area which merge with corresponding ones of the volute passages 21, 22, 23 and 24. The passage joining the intake aperture 29 with volute passage 21 is shown at 41 in FIG. 1, it being understood that an identical passage just beside passage 41 connects the intake aperture 31 with the volute passage 22. Similarly, the intake apertures in the flange 28 are joined to volute passages 23 and 24, one of such passages being indicated at 42 in FIG. 1. It should be noted that the axes of the passages 41 and its adjacent duplicate are substantially parallel and extend tangentially from one side of the turbine wheel while the passage 42 and its adjacent duplicate also have their axes substantially parallel and extend tangentially from the opposite side of the turbine wheel.

Figure 4:
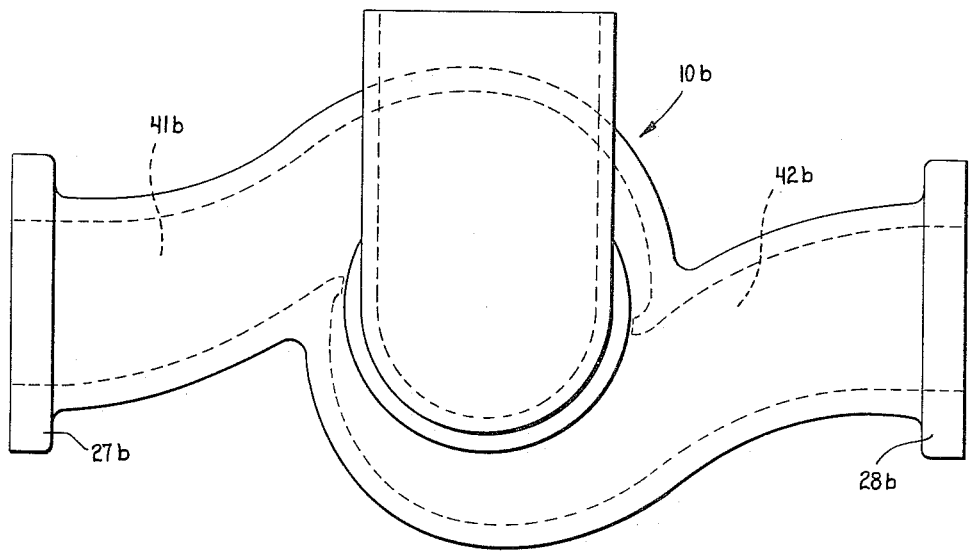
FIG. 4 is a view similar to FIG. 1 but showing a modified form of the turbine housing having passages which converge slightly along their length leading from each intake aperture to a portion of the turbine wheel periphery.

FIG. 4 discloses a turbine housing quite similar to that previously described and differing only in that the passages joining the intake apertures and the volute passages opening to the turbine wheel are convergent slightly along their length, rather than uniform in cross-section. In the structure of FIG. 4, the housing 10b has turbine flanges 27b and 28b. The flanges each encircle two side-by-side intake apertures (not shown) which are the counterparts of the intake apertures referred to with reference to FIGS. 1 and 3. The passages 41b and 42b and their adjacent duplicates are comparable to the passages 41 and 42 of FIG. 1 but differ therefrom in that they converge slightly along their length from the intake apertures to the volute passages opening to the turbine wheel.

It will be understood that while two side-by-side cavities, divided into four volute passages by two transverse partitions have been shown and described herein, additional transverse partitions might be utilized to split the adjacent cavities into additional volute passages opening to the turbine wheel, such passages each occupying an equal arcuate segment of the turbine wheel periphery. The multiple volute apertures, each opening into the maximum arcuate area of the turbine wheel periphery provides for increased efficiency in expanding the exhaust gases through the turbine wheel.

What is claimed is:

1. An exhaust gas driven turbine assembly comprising a housing having four inlet apertures, a turbine wheel mounted for rotation within the housing, said housing having two parallel arcuate cavities encircling said wheel periphery and open thereto, said cavities being divided in the plane of the turbine wheel to provide four separated volute passages each opening to the periphery of said turbine wheel, four convergent passages in said housing extending between and joining separate ones of said inlet apertures and volute passages, the axes of two of said convergent passages being substantially parallel and extending tangentially from one side of said turbine wheel, the axes of the other two of said convergent passages being substantially parallel and extending tangentially from the opposite side of said turbine wheel.

2. An exhaust gas driven turbine assembly comprising a housing having a plurality of inlet apertures, a turbine wheel mounted for rotation within the housing, said housing having at least two parallel arcuate cavities encircling said wheel periphery and open thereto, said cavities being divided in the plane of the turbine wheel to provide a plurality of separated volute passages each opening to the periphery of said turbine wheel, a plurality of convergent passages in said housing extending between and joining separate ones of said inlet apertures and volute passages, the axes of certain of said convergent passages being substantially parallel and extending tangentially from one side of said turbine wheel, the axes of others of said convergent passages being substantially parallel and extending tangentially from the opposite side of said turbine wheel.

3. An exhaust gas driven turbine assembly comprising a housing having four inlet apertures, a turbine wheel mounted for rotation within the housing, said housing having two parallel arcuate cavities encircling said wheel periphery and open thereto, said cavities being divided in the plane of the turbine wheel to provide four separated volute passages each opening to the periphery of said turbine wheel, four passages in said housing substantially uniform in cross-sectional area along their length and extending between and joining separate ones of said inlet apertures and volute passages, the axes of two of said uniform passages being substantially parallel and extending tangentially from one side of said turbine wheel, the axes of the other two of said uniform passages being substantially parallel and extending tangentially from the opposite side of said turbine wheel.

4. An exhaust gas driven turbine assembly comprising a housing having a plurality of inlet apertures, a turbine wheel mounted for rotation within the housing, said housing having at least two parallel arcuate cavities encircling said wheel periphery and open thereto, said cavities being divided in the plane of the turbine wheel to provide a plurality of separated volute passages each opening to the periphery of said turbine wheel, passages in said housing substantially uniform in cross-sectional area along their length and extending between and joining separate ones of said inlet apertures and volute passages, the axes of certain said uniform passages being substantially parallel and extending tangentially from one side of said turbine wheel, the axes of others of said uniform passages being substantially parallel and extending tangentially from the opposite side of said turbine wheel.

5. An exhaust gas driven turbine assembly comprising a housing having a plurality of inlet apertures, a turbine wheel mounted for rotation within the housing, said housing having at least two parallel arcuate cavities encircling said wheel periphery and open thereto, said cavities being divided in the plane of the turbine wheel to provide a plurality of separated volute passages each opening to the periphery of said turbine wheel, intermediate passages in said housing extending between and joining separate ones of said inlet apertures and volute passages, the axes of certain of said intermediate passages being substantially parallel and extending tangentially from one side of said turbine wheel, the axes of others of said intermediate passages being substantially parallel and extending tangentially from the opposite side of said turbine wheel.

References Cited by the Examiner

UNITED STATES PATENTS

| | | | |
|---|---|---|---|
| 1,889,816 | 12/1932 | White | 103—103 |
| 2,390,506 | 12/1945 | Buchi | 253—39 |
| 2,577,179 | 12/1951 | Buchi. | |
| 2,635,849 | 4/1953 | Buchi. | |
| 2,730,861 | 1/1956 | Buchi | 60—13 |
| 3,081,019 | 3/1963 | Freeval | 230—133 X |
| 3,132,493 | 5/1964 | Peckham et al. | 103—103 |

FOREIGN PATENTS 925,984    5/1953    Great Britain.

RICHARD B. WILKINSON, *Primary Examiner.*